United States Patent

[11] 3,555,982

[72] Inventor Joseph D. George
    1263 Royal York Road, Islington, Ontario,
    Canada
[21] Appl. No. 752,342
[22] Filed Aug. 13, 1968
[45] Patented Jan. 19, 1971

[54] EXPANSION JOINT SEAL
    5 Claims, 5 Drawing Figs.
[52] U.S. Cl. ................................................. 94/18,
                                                              14/16
[51] Int. Cl. ............................................... E01c 11/10
[50] Field of Search ........................................ 94/18;
                                                              14/16

[56]              References Cited
            UNITED STATES PATENTS
1,612,274  12/1926  Fischer ........................  94/18UX
1,711,842   5/1929  Hall ...........................  94/18
1,723,306   8/1929  Sipe ...........................  94/18UX
1,978,283  10/1934  Rew ...........................  94/18
3,165,986   1/1965  Hirst ..........................  94/18
3,245,328   4/1966  Fassbinder ....................  94/18
3,316,574   5/1967  Pare ..........................  14/16
3,375,763   4/1968  Welch .........................  94/18

Primary Examiner—Jacob L. Nackenoff
Attorney—Fetherstonhaugh and Co.

ABSTRACT: This invention relates to an expansion joint seal of the type commonly used in sealing adjacent deck panels of a bridge, although it could be used in any case where a seal for an expansion joint between two panels is required. The seal consists essentially of an elastomer strip with transversely extending holes adapted to receive load-bearing bars in sliding relation so that as the panels expand and contract, the elastomer can follow the expansion and contraction and slide relative to the load-bearing bars. The particular advantage of the construction is that the elastomer moves with respect to the bar for substantially the full extent of the width of the seal so that the elastomer is stressed over substantially its full width as the joint expands and contracts.

PATENTED JAN 19 1971    3,555,982

*INVENTOR.*
JOSEPH D. GEORGE

BY *Fetherstonhaugh & Co.*

ATTORNEYS

EXPANSION JOINT SEAL

This invention relates to an expansion joint seal for sealing the space between opposed edges to two deck sections and has wide application to the sealing of spaces between adjacent deck sections on a concrete bridge or the like.

The sealing of adjacent deck sections in bridge construction and in other constructions against the ingress of water is a very important part of maintenance. Water entering between adjacent sections tends to seep down into metal parts beneath the deck and rust the construction. There are available untold numbers of expansion joint seals. Some of them depend primarily on reinforced elastomer materials for a seal; others depend upon intermeshing metallic elements. They all require maintenance and they do the job with less than sought after efficiency. They vary in cost, but, generally speaking, they are expensive. Many of the seals that depend upon an elastomer stress the elastomer locally as expansion and contraction between the adjacent sections takes place. This is undesirable because it means that the adjustment puts large unit stresses on the relatively short sections of the elastomer that provide the adjustment. Other elastomer type joint seals rely upon the elastomer being under substantial compressive stress at all times. This is not desirable.

This invention overcomes these common objections to commonly used elastomer type expansion joint seals and at the same time provides an economical expansion joint seal that gives an efficient seal under all conditions of weather between two adjacent deck sections.

It is therefore an object of this invention to provide an elastomer type expansion joint seal for adjacent deck sections wherein the elastomer is not under heavy stress of compression or expansion between the two deck sections.

It is a further object of the invention to provide an expansion joint seal that is easy to maintain.

It is a further object of the invention to provide an expansion joint seal that is not unduly high in cost.

With these and other objects in view, an expansion joint seal according to this invention comprises an elongated strip of elastomer material with opposed side marginal portions, each adapted for securement to an edge of a pair of juxtaposed panels, said strip being formed with a series of spaced apart transversely extending openings, a series of load-bearing bars, each of the said openings being adapted to receive one of said bars in sliding relation, said bars each having a length adapted to extend to said side marginal portions of said strip whereby in use each end overlies an edge of a pair of juxtaposed panels.

The invention will be clearly understood after reference to the following detailed specification read in conjunction with the drawings.

Figure 1:
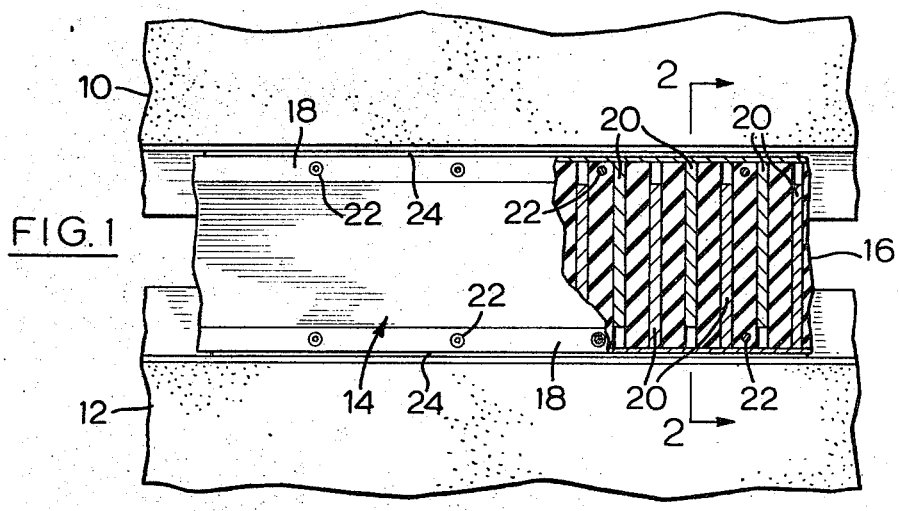
FIG. 1 is a plan view of a portion of an expansion joint according to this invention.

Referring to the drawings, the numerals 10 and 12 refer to adjacent deck sections or panels of a bridge deck.

They are commonly constructed of concrete or steel and the space between them must be sealed in order to prevent water and snow from falling down from the top of the deck on to the bridge members and bearings beneath the deck. These sections must be spaced apart to allow for expansion and an expansion joint seal according to this invention is generally indicated by the numeral 14. It comprises a strip of rubber or like elastomer material 16, the opposed side marginal portions of which are adapted to be connected to the marginal edge portions of the opposed spaced apart decks 10 and 12. A spine 18 of steel having a U-shaped cross section extending along each of the opposed side margins of the strip 14 is adhesively secured to the side edge of strip 16, and a series of load-bearing bars 20 extend from each spine 18 transversely and substantially all across the elastomer strip 16 to adjacent the opposite spine so that their free ends in each case overlie the marginal edge portions of one of the decks 10 or 12. The openings which accommodate bars 20 are of a size to permit the bars to slide with respect to the elastomer. Bolts 22 extend through the spines 18 at spaced apart points along the length to secure the opposed side margins of the strip 14 to the deck sections 10 and 12. Space at the spines is filled in with a liquid sealant that sets as indicated at 24.

The strip 14 will, in use, have a thickness depending upon the size of the expansion joint in the structure. The strip 14 preferably has a width such that it is in slight compression laterally of itself under all conditions of use. The load-bearing bars 14 are adapted to support loads passing over the deck sections, and, in the case of a bridge, must be strong enough to support automobile and truck traffic.

The load-bearing bars 20 are freely movable within appropriately formed holes in the elastomer material so that as the space between the deck sections 10 and 12 varies with temperature conditions, the load-bearing bars 20 are free to slide with respect to the elastomeric strip that houses them. It will be noted that the free ends of the bars overlie the marginal edge portion of a deck section. The elastomeric material 16 is preferably under compression under all conditions of deck section expansion and is capable of accommodating the variation in the space between opposing deck sections within its elastic limits. It will be noted that the expansion of the adjacent deck sections is uniformly distributed over the full width of the elastomer strip.

The load-bearing bars preferably alternate from the spine at one side of the joint and the spine at the other side of the joint, so that each free end of a bar is between a retained end of two neighboring bars. This restrains the free ends of the bars against vertical movement due to traffic over the decks in use.

In use, adjacent deck edges are sealed as the marginal edges of the elastomer strip are bolted into place. The seal is a positive and simple one to make. Preferably a liquid sealant 24 is poured into the space at the edge portions which sets to complete the seal.

Figure 4:
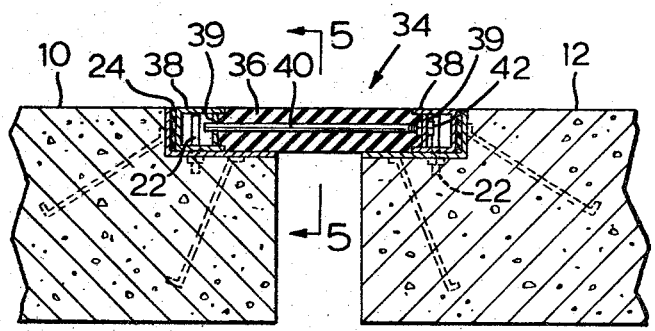
FIG. 4 is a section similar to FIG. 2 showing an alternative construction.
Figure 5:
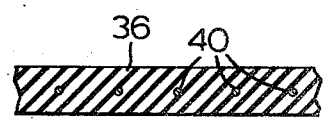
FIG. 5 is a view along the line 5-5 of FIG. 4.

A further embodiment of the invention is shown in FIGS. 4 and 5 where the seal is generally indicated by the numeral 34. In this case the side marginal portions of the elastomeric material 36 are embraced by the channellike spines 38 and a series of load-bearing bars 40 extend transversely across the strip, but in this case the bars are all connected to and extend from the spine 38 on the right. They are each bolted to a metal wall 39 that extends longitudinally of the spine 38 by means of cooperating nuts as at 42. At their free ends the bars 40 extend through holes in the wall 39 of the spine on the left. Bars 40 are a sliding fit in holes in wall 39 of the left spine and in use the holes function to restrain the free ends of the bars from undue vertical movement as the section is loaded from above. Bars 40 are a slide fit in holes through the elastomer sealing strip 36 so that as expansion and contraction of the deck sections takes place as climatic conditions vary, the load-bearing bars slide with respect to the sealing member 36. The free ends of the load-bearing bars 40 extend through the holes in the plate 39 a sufficient amount such that they will not withdraw from the holes under extreme climatic conditions. Elastomer member 36 is in the design of FIGS. 4 and 5 also intended to be under slight compression under maximum opening of the joint in the structure.

Figure 2:
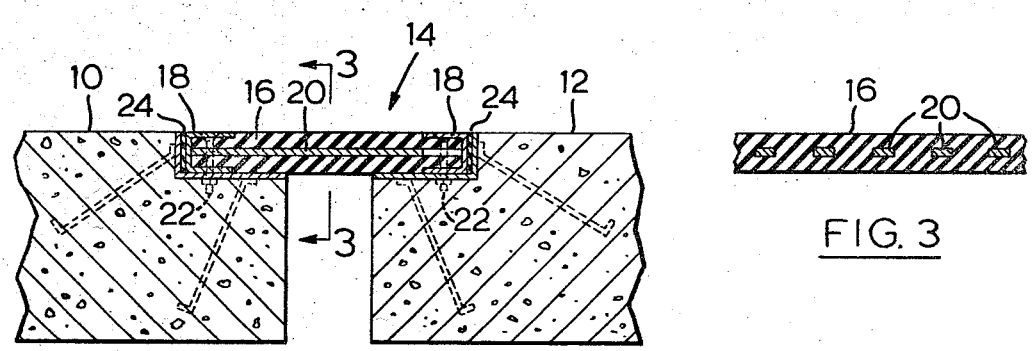
FIG. 2 is an enlarged sectional view along the line 2-2 of FIG. 1.
Figure 3:
FIG. 3 is a section along the line 3-3 of FIG. 1.

The embodiment of FIGS. 1 to 3 and the embodiment of FIGS. 4 and 5 function in a similar manner in that in each case the elastomeric member 36 extends and contracts as the adjacent deck sections 10 and 12 move away from and towards each other due to climatic conditions and setting conditions of the structure. As this occurs, the load-bearing members 20 and 40 respectively slide with respect to the elastomeric members 16 and 36 respectively. The major difference between the two embodiments is the manner in which the free ends of the load-bearing bars are restrained against vertical movement as load passes over the adjacent deck sections.

It will be apparent from the foregoing description that this invention has provided a very inexpensive, but yet effective seal, that makes maximum use of the resilient features of the elastomer material and that is well supported and reinforced mechanically.

Embodiments of this invention other than the ones illustrated will be apparent to those skilled in the art. An essential feature of the invention is the provision of the transversely extending load-bearing bars, which are housed in holes in the elastomer strip and which can slide with respect to the strip. This feature permits the distribution of the stress on the elastomer member as the bridge sections expand and contract over substantially the full width of the elastomer member. In the embodiments of the invention illustrated, the load-bearing bars have been illustrated as secured with respect to the strip at one side marginal portion of the strip. This securement is not necessary to achieve the advantage of the sliding relation of the load-bearing bars with respect to the elastomer over substantially the full length of the bars. Modifications of the inventive concept of providing slidable load-bearing bars will be apparent, and it is not intended that the foregoing examples should be considered as a limitation of this particular inventive feature.

I claim:

1. An expansion joint seal for the space between a pair of juxtaposed panels comprising an elongated strip of elastomer material with opposed side marginal portions each secured to opposed marginal edge portions of a pair of juxtaposed panels, said strip being formed with a series of spaced apart transversely extending openings, a series of load-bearing bars, each of said openings containing one of said bars, each of said bars being shorter than and slidable within its respective opening whereby said strip and said bars can move relatively to each other as said strip expands or contracts in width, said bars each having a length extending between side marginal portions of said strip whereby each end overlies a marginal edge portion of said pair of juxtaposed panels, means for securing one end of each of said load-bearing bars with respect to said strip at one side marginal portion of said strip, said load-bearing bars in adjacent openings being secured with respect to said strip at opposite marginal portions of said strip, the spacing of adjacent bars being close, the free end of each load-bearing bar being between the secured end of its two adjacent load-bearing bars and thereby restrained against vertical movement.

2. An expansion joint seal comprising an elongated strip of elastomer material with opposed side marginal portions each adapted for securement to an edge of a pair of juxtaposed panels, said strip being formed with a series of spaced apart transversely extending openings, a series of load-bearing bars, each of said openings being adapted to receive one of said bars in sliding relation, each of said openings being longer than its respective bar whereby said strip and said bars can move relatively to each other as said strip expands or contracts in width, said bars each having a length adapted to extend to said side marginal portions of said strip whereby in use each end can be caused to overlie an edge of a pair of juxtaposed panels, means for securing one end of each of said load-bearing bars with respect to said strip at one side marginal portion of said strip, load-bearing bars in adjacent openings being secured with respect to said strip at one marginal portion of said strip and in which means are provided at the other marginal portion of said strip for restraining the vertical movement of the free ends of said load-bearing bars.

3. An expansion joint seal for the space between a pair of juxtaposed panels comprising an elongated strip of elastomer material with opposed side marginal portions each secured to opposed marginal edge portions of a pair of juxtaposed panels, said strip being formed with a series of spaced apart transversely extending openings, a series of load-bearing bars, each of said openings containing one of said bars, each of said bars being shorter than and slidable within its respective opening whereby said strip and said bars can move relatively to each other as said strip expands or contracts in width, said bars each having a length extending between side marginal portions of said strip whereby each end overlies a marginal edge portion of said pair of juxtaposed panels, means for securing one end of each of said load-bearing bars with respect to said strip at one side marginal portion of said strip, said load-bearing bars in adjacent openings being secured with respect to said strip at opposite marginal portions of said strip whereby the free end of each load-bearing bar is between the secured end of its two adjacent load-bearing bars and is thereby restrained against vertical movement, and means for securing each of said side marginal portions of said strip to an opposed edge of a pair of juxtaposed panels.

4. An expansion joint seal for the space between a pair of juxtaposed panels comprising an elongated strip of elastomer material with opposed side marginal portions each secured to opposed marginal edge portions of a pair of juxtaposed panels, said strip being formed with a series of spaced apart transversely extending openings, a series of load-bearing bars, each of said openings containing one of said bars, each of said bars being shorter than and slidable within its respective opening whereby said strip and said bars can move relatively to each other as said strip expands or contracts in width, said bars each having a length extending between side marginal portions of said strip whereby each end overlies a marginal edge portion of said pair of juxtaposed panels, means for securing one end of each of said load-bearing bars with respect to said strip at one side marginal portion of said strip, load-bearing bars in adjacent openings being secured with respect to said strip at one marginal portion of said strip, means at the other marginal portion of said strip for restraining the vertical movement of the free ends of said load-bearing bars, and means for securing each of said side marginal portions of said strip to an opposed edge of a pair of juxtaposed panels.

5. An expansion joint seal comprising an elongated strip of elastomer material with opposed side marginal portions each adapted for securement to an edge of a pair of juxtaposed panels, said strip being formed with a series of spaced apart transversely extending openings, a series of load-bearing bars, each of said openings being adapted to receive one of said bars in sliding relation, each of said openings being longer than its respective bar whereby said strip and said bars can move relatively to each other as said strip expands or contracts in width, said bars each having a length adapted to extend to said side marginal portions of said strip whereby in use each end can be caused to overlie an edge of a pair of juxtaposed panels, and means for restraining the vertical movement of said bars adjacent their free ends.